United States Patent
Kim et al.

(10) Patent No.: US 9,036,328 B2
(45) Date of Patent: May 19, 2015

(54) MULTILAYER CERAMIC ELECTRONIC COMPONENT

(71) Applicant: SAMSUNG ELECTRO-MECHANICS CO., LTD., Gyunggi-do (KR)

(72) Inventors: Sang Huk Kim, Gyunggi-do (KR); Jae Hun Choe, Gyunggi-do (KR); Jae Sung Park, Gyunggi-do (KR); Byung Soo Kim, Gyunggi-do (KR); Seon Ki Song, Gyunggi-do (KR); Jun Hee Kim, Gyunggi-do (KR); Ju Myung Suh, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 215 days.

(21) Appl. No.: 13/678,044

(22) Filed: Nov. 15, 2012

(65) Prior Publication Data

US 2013/0070386 A1 Mar. 21, 2013

Related U.S. Application Data

(63) Continuation of application No. 13/478,599, filed on May 23, 2012, now Pat. No. 8,335,072.

(30) Foreign Application Priority Data

May 31, 2011 (KR) .................. 10-2011-0052479

(51) Int. Cl.
*H01G 4/30* (2006.01)
*H01G 4/005* (2006.01)
*H01G 4/012* (2006.01)
*H01G 4/12* (2006.01)

(52) U.S. Cl.
CPC .................. *H01G 4/30* (2013.01); *H01G 4/012* (2013.01); *H01G 4/12* (2013.01)

(58) Field of Classification Search
USPC ....................................... 361/301.4, 303, 311
See application file for complete search history.

(56) References Cited

U.S. PATENT DOCUMENTS

| | | | |
|---|---|---|---|
| 4,477,858 | A | 10/1984 | Steiner |
| 6,377,439 | B1 | 4/2002 | Sekidou et al. |
| 6,912,115 | B2 | 6/2005 | Kobayashi et al. |
| 7,295,420 | B2 | 11/2007 | Kojima et al. |
| 7,298,603 | B2 | 11/2007 | Mizuno et al. |
| 2006/0256504 | A1 | 11/2006 | Kojima |

FOREIGN PATENT DOCUMENTS

| | | |
|---|---|---|
| JP | 2006-278566 A | 10/2006 |
| JP | 2007-035850 A | 2/2007 |

*Primary Examiner* — Eric Thomas
(74) *Attorney, Agent, or Firm* — McDermott Will & Emery LLP (57) ABSTRACT

There is provided a multilayer ceramic electronic component including a lamination main body including a plurality of inner electrodes. When T1 represents a distance between vertically adjacent inner electrodes in a central portion of the lamination main body, and T2 represents a distance between vertically adjacent inner electrodes at an edges of the inner electrodes in a widthwise direction, a ratio (T2/T1) of T2 to T1 is 0.80 to 0.95.

20 Claims, 4 Drawing Sheets

MULTILAYER CERAMIC ELECTRONIC COMPONENT

CROSS-REFERENCE TO RELATED APPLICATIONS

This application is a Continuation of U.S. application Ser. No. 13/478,599, filed May 23, 2012, and now U.S. Pat. No. 8,335,072, issued on Dec. 18, 2012, which claims the priority of Korean Patent Application No. 10-2011-0052479 filed on May 31, 2011, in the Korean Intellectual Property Office, the disclosures of which are incorporated herein by reference.

BACKGROUND OF THE INVENTION

1. Field of the Invention

The present invention relates to a multilayer ceramic electronic component and, more particularly, to a multilayer ceramic electronic component having excellent reliability.

2. Description of the Related Art

In general, an electronic component using a ceramic material such as a capacitor, an inductor, a piezoelectric element, a varistor, a thermistor, or the like, includes a ceramic main body made of a ceramic material, inner electrodes formed within the interior of the ceramic main body, and outer electrodes installed on a surface of the ceramic main body such that they are connected with the inner electrode.

Among ceramic electronic components, a multilayer ceramic capacitor includes a plurality of laminated dielectric layers, inner electrodes disposed to face each other with a dielectric layer interposed therebetween, and outer electrodes electrically connected with the inner electrodes.

The multilayer ceramic capacitor is commonly used as a component of mobile communication devices such as computers, PDAs (Personal Digital Assistants), mobile phones, and the like, due to its advantages of being small, guaranteeing high capacity, and being easily mounted.

Recently, as electronic products have been reduced in size and the multifunctionality thereof has been developed, chip components have also become compact and highly functional, so a multilayer ceramic capacitor product which is small but has high capacity is therefore in demand.

In order to increase the capacity of the multilayer ceramic capacitor, the thicknesses of a dielectric layer and the inner electrode layer are required to be reduced and the number of laminated layers thereof is required to be increased. However, as the dielectric layer and the inner electrodes are thinned and the number of laminated layers thereof increases, there is a high possibility of a dielectric breakdown, a delamination and cracks to thereby degrade the reliability of the multilayer ceramic capacitor. Thus, there is a limitation in reducing the size of the multilayer ceramic capacitor and increasing the capacity of the multilayer ceramic capacitor.

SUMMARY OF THE INVENTION

An aspect of the present invention provides a multilayer ceramic electronic component having excellent reliability.

According to an aspect of the present invention, there is provided a multilayer ceramic electronic component including: a lamination main body including a dielectric layer; and a plurality of inner electrode layers formed within the lamination main body and having ends exposed from one or more faces of the laminated main body, wherein when a distance between central portions of adjacent inner electrodes among the plurality of inner electrodes is T1 and a distance between non-exposed edges of the adjacent inner electrodes is T2, a ratio (T2/T1) of T2 to T1 is 0.80 to 0.95.

The distance T1 between the central portions of the adjacent inner electrodes in a lamination direction may be less than 0.66 μm.

The distances T1 and T2 may be measured in a section perpendicular to a first face of the lamination main body, wherein the edges of the inner electrodes are not exposed from the first face of the lamination main body.

A thickness D1 of a central portion of the lamination main body is greater than a thickness D2 of a first face of the lamination main body, wherein the edges of the inner electrodes are not exposed from the first face of the lamination main body.

A ratio of the thickness D2 of the first face of the lamination main body to the thickness D1 of the central portion of the lamination main body may be 0.78 to 0.95.

The thickness of the central portion of the lamination main body may be measured at a capacity formation portion in which the plurality of inner electrodes overlap each other.

The thickness D1 of the central portion of the lamination main body may range from 200 μm to 300 μm.

A thickness D1 of a central portion of the lamination main body may be greater than a thickness D3 of a second of the lamination main body, wherein the ends of the inner electrodes are exposed from the second face of the lamination main body.

A ratio of the thickness D3 of the second face of the lamination main body to the thickness D1 of the central portion of the lamination main body may be 0.75 to 0.97.

The thickness D3 of the second face of the lamination main body may be measured at an area of the lamination main body in which the inner electrodes are present.

A thickness of one of the inner electrode layers may be 0.7 μm or less.

According to another aspect of the present invention, there is provided a multilayer ceramic capacitor including: a lamination main body having first and second faces; and a plurality of inner electrode layers formed within the lamination main body and having ends exposed from the first and second faces, respectively, wherein when a distance between central portions of adjacent inner electrodes among the plurality of inner electrodes is T1 and a distance between non-exposed edges of the adjacent inner electrodes in a lamination direction is T2, a ratio (T2/T1) of T2 to T1 is 0.80 to 0.95, and the distance between the central portions of the adjacent inner electrodes is less than 0.66 μm.

The first and second faces may oppose each other and be disposed in a lengthwise direction of the lamination main body.

A thickness D1 of a central portion of the lamination main body may be greater than a thickness D2 of a third face of the lamination main body, wherein the edges of the inner electrodes are not exposed from the third face.

A ratio of the thickness D2 of the third face of the lamination main body to the thickness D1 of the central portion of the lamination main body may be 0.78 to 0.95. A ratio of the thickness D3 of one of the first and the second faces of the lamination main body to the thickness D1 of a central portion of the lamination main body may be 0.75 to 0.97.

According to another aspect of the present invention, there is provided a multilayer ceramic capacitor including: a lamination main body; a plurality of first and second inner electrode layers formed within the lamination main body and having ends exposed from one of end faces of the lamination main body in a lengthwise direction, respectively; and a dielectric layer disposed between the first and second inner electrode layers and having a thickness less than 0.66 μm, wherein a thickness D1 of a central portion of the lamination main body is greater than a thickness D2 of an edge portion of the lamination main body in a widthwise direction, and when a distance between adjacent inner electrodes in the central portion of the lamination main body is T1 and a distance between the adjacent inner electrodes at the edges of the inner electrodes in the widthwise direction is T2, a ratio (T2/T1) of T2 to T1 is 0.80 to 0.95.

A ratio of the thickness D2 of the edge portion of the lamination main body in the widthwise direction to the thickness D1 of the central portion of the lamination main body may be 0.78 to 0.95.

The thickness D1 of the central portion of the lamination main body may be greater than a thickness D3 of the end faces of the lamination main body in the lengthwise direction.

A ratio of the thickness D3 of the end faces of the lamination main body in the lengthwise direction to the thickness D1 of the central portion of the lamination main body may be 0.75 to 0.97.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 1:
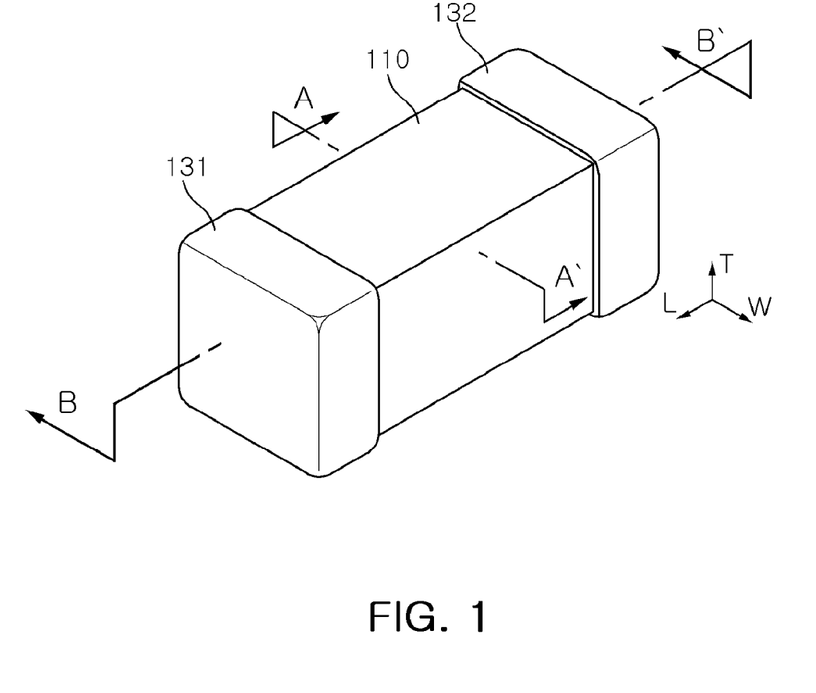
FIG. 1 is a schematic perspective view of a multilayer ceramic capacitor according to an embodiment of the present invention.
Figure 2:
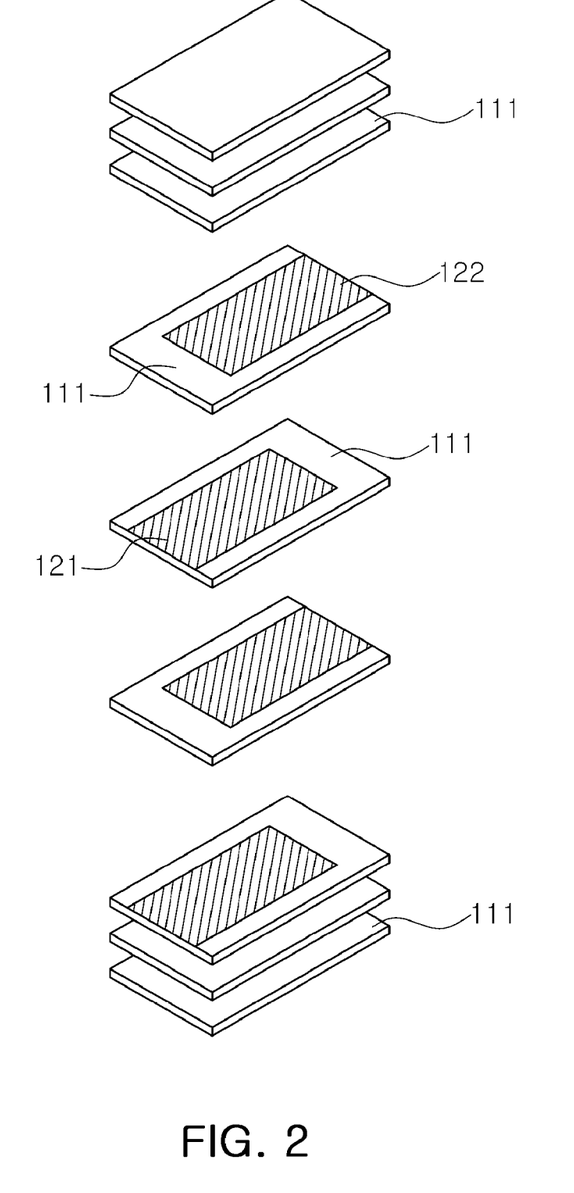
FIG. 2 is a schematic exploded perspective view of a lamination main body according to an embodiment of the present invention.
Figure 3:
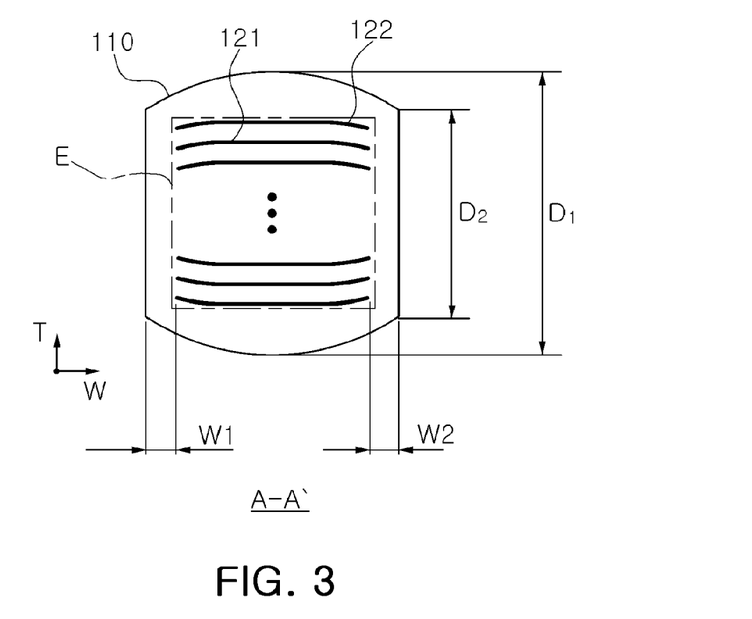
FIG. 3 is a cross-sectional view taken along line A-A' in FIG. 1.
Figure 4:
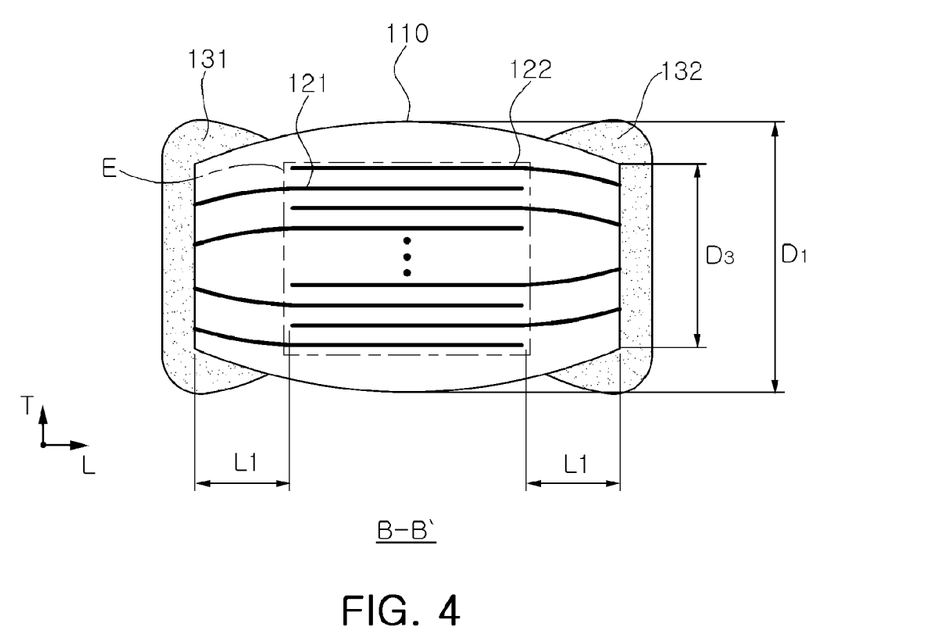
FIG. 4 is a cross-sectional view taken along line B-B' in FIG. 1.
Figure 5:
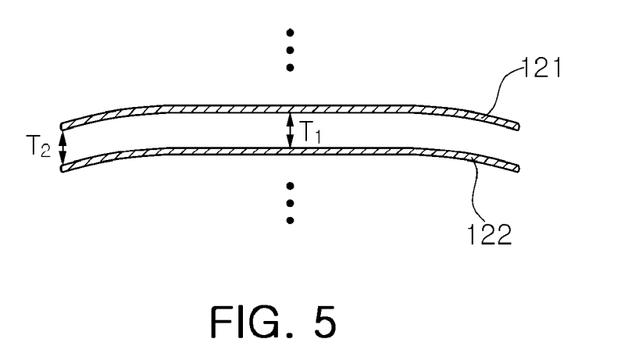
FIG. 5 is an enlarged sectional view of a portion of a section in a widthwise direction of the multilayer ceramic capacitor.

FIG. 1 is a schematic perspective view of a multilayer ceramic capacitor according to an embodiment of the present invention, and FIG. 2 is a schematic exploded perspective view of a lamination main body. FIG. 3 is a cross-sectional view taken along line A-A' in FIG. 1, namely, a cross-sectional view taken in a widthwise direction (or in a W direction) of the multilayer ceramic capacitor. FIG. 4 is a cross-sectional view taken along line B-B' in FIG. 1, namely, a cross-sectional view taken in a lengthwise direction (or in an L direction) of the multilayered ceramic capacitor. FIG. 5 is an enlarged sectional view of a portion of a section in a widthwise direction of the multilayer ceramic capacitor.

In the present embodiment, it may be defined such that the 'lengthwise direction' of the multilayer ceramic capacitor is the 'L' direction, the 'widthwise direction' is the 'W' direction, a 'thicknesswise direction' is the 'T' direction (or a vertical direction) in FIG. 1. The 'thicknesswise direction' may have the same concept as a 'lamination direction' in which dielectric layers are laminated.

With reference to FIGS. 1 through 5, the multilayer ceramic capacitor according to an embodiment of the present invention may include a lamination main body 110, and outer electrodes 131 and 132 formed at both end portions of the lamination main body.

As shown in FIG. 2, the lamination main body 110 may be formed by laminating a plurality of dielectric layers 111 in the thicknesswise direction. The plurality of dielectric layers constituting the lamination main body 110 are in a sintered state to be integrated such that the boundary between adjacent dielectric layers cannot easily be discerned.

The dielectric layers may be made of ceramic powder having high permittivity. For example, a barium titanate ($BaTiO_3$)-based powder, a strontium titanate ($SrTiO_3$)-based powder, or the like, may be used, but the present invention is not limited thereto. The thickness of one dielectric layer 111 may be less than 0.66 μm, but the present invention is not limited thereto. Alternatively, the thickness of one dielectric layer 111 may be 0.4 μm or greater but less than 0.66 μm. Alternatively, the thickness of one dielectric layer 111 may range from 0.45 μm to 0.55 μm.

In an embodiment of the present invention, the thickness of one dielectric layer 111 may refer to an average thickness of one dielectric layer 111 disposed between the inner electrode layers 121 and 122. The average thickness of the dielectric layer may be measured by scanning an image of a section in the lengthwise direction of the lamination main body 110 as shown in FIG. 4 by using a scanning electron microscope (SEM) of 10,000 magnifications. In detail, the thickness of one dielectric layer 111 may be measured at 30 points at equal intervals in the lengthwise direction in the scanned image, to thus measure the average thickness value thereof. The 30 points at equal intervals may be designated at a capacity formation portion E. As shown in FIG. 4, the capacity formation portion E may refer to an area in which the first and second inner electrodes 121 and 122 overlap each other. Also, such an average value measurement may extend to be performed at 10 dielectric layers to measure an average value, whereby an average thickness of the dielectric layers can be further generalized.

Also, the thickness of one dielectric layer may be defined as an average distance between the central portions of the mutually adjacent inner electrode layers 121 and 122. For example, the distances between mutually adjacent inner electrode layers may be measured at 30 points at equal intervals in the lengthwise direction of the inner electrode layers may be measured on the scanned image to calculate an average distance. Also, the average distance between mutually adjacent inner electrode layers may extend to ten pairs of inner electrode layers disposed at the capacity formation portion E to measure an average distance, whereby the average distance between mutually adjacent inner electrode layers can be further generalized.

The distance between the central portions of the mutually adjacent first inner electrode layer 121 and the second inner electrode layer 122 may be less than 0.66 μm, but the present invention is not limited thereto. Alternatively, the distance between the central portions of the mutually adjacent first and second inner electrode layers 121 and 122 may be 0.4 µm or greater but less than 0.66 µm. Alternatively, the distance between the central portions of the mutually adjacent first and second inner electrode layers 121 and 122 may range from 0.45 µm to 0.55 µm.

A plurality of inner electrodes 121 and 122 may be formed in the interior of the lamination main body 110. The inner electrodes 121 and 122 are formed on the dielectric layers 111 and may be disposed such that the inner electrodes 121 and 122 face each other with one dielectric layer interposed therebetween in the lamination direction of the dielectric layers through sintering. The inner electrode layers may be made of a conductive metal such as nickel (Ni), copper (Cu), palladium (Pd), or the like, and the thickness of one inner electrode layer may be 0.7 µm or less, but the present invention is not limited thereto According to an embodiment of the present invention, more than two hundred dielectric layers, on which the inner electrode layers are respectively formed, may be laminated.

As for the plurality of inner electrodes 121 and 122, the first and second inner electrodes 121 and 122, having different polarities, may be paired.

A lengthwise directional marginal portion L1, in which the first inner electrode 121 or the second inner electrode 122 are not formed, may be formed in the lengthwise direction L of the lamination main body 110, and widthwise directional marginal portions W1 and W2, in which the first inner electrode 121 and the second inner electrode 122 are not formed, may be formed in the widthwise direction W of the lamination main body 110.

One end of each of the first and second inner electrodes 121 and 122 is spaced apart from one end face of the lamination main body by the presence of the lengthwise directional marginal portion L1, and the other end of each of the first and second inner electrodes 121 and 122 may be exposed from one end face of the lamination main body.

The ends of the first and second inner electrodes 121 and 122 exposed respectively from both end faces of the lamination main body 110 may be respectively electrically connected with the first and second outer electrodes 131 and 132 formed on both end faces of the lamination main body.

Capacitance may be formed in an area of the lamination main body 100, in which the first and second inner electrodes 121 and 122 overlap each other, when an electric field is applied thereto. In an embodiment of the present invention, the area in which the first and second inner electrodes 121 and 122 overlap each other will be referred to as the capacity formation portion E. Also, an area of the lamination main body, in which the first and second inner electrodes do not overlap each other and only the first inner electrode or the second inner electrode is formed, will be referred to as an electrode draw-out portion. The electrode draw-out portion may be formed by the lengthwise directional marginal portion L1. According to an embodiment of the present invention, the first inner electrode or the second inner electrode may be exposed to one end of the lamination main body through the electrode draw-out portion.

According to an embodiment of the present invention, the end of each of the inner electrodes may be exposed from one or more faces of the lamination main body, but the present invention is not limited thereto.

Although not shown, the first or second inner electrodes may be exposed from the same face of the lamination main body. Alternatively, the ends of the first or second inner electrodes may be exposed from two or more faces of the lamination main body by two or more electrode draw-out portions.

According to an embodiment of the present invention, the thickness of the central portion of the lamination main body may be greater than that of one face, of the lamination main body, from which the ends of the inner electrodes are not drawn out.

As shown in FIG. 3, according to an embodiment of the present invention, the thickness D1 of the central portion of the lamination main body may be greater than the thickness D2 of the edge portion of the lamination main body in the widthwise direction. The thickness D1 of the central portion of the lamination main body may be measured at the capacity formation portion E in which the first and second inner electrodes 121 and 122 overlap each other to form capacitance. Also, the thickness D1 of the central portion of the lamination main body may be a maximum thickness of the lamination main body. The thickness D2 of the edge portion of the lamination main body in the widthwise direction may be measured at the widthwise directional marginal portions W1 and W2 in which the inner electrodes are not formed.

There is a difference in density between the capacity formation portion E of the lamination main body in which the first and second inner electrodes overlap each other and the marginal portions in which the first inner electrode or the second inner electrode is not formed. When the difference in density between the capacity formation portion E and the marginal portions is increased, the marginal portion may be delaminated or cracked. Then, a plating solution may infiltrate into the delaminated or cracked portion, resulting in a degradation of the reliability of the multilayer ceramic capacitor.

According to an embodiment of the present invention, the capacity formation portion E and the widthwise directional marginal portions W1 and W2 are differentially compressed to reduce the difference in density. A delamination or cracking incidence of the multilayer ceramic capacitor can be lowered and dielectric breakdown voltage characteristics can be improved by adjusting the ratio of the thicknesses of the capacity formation portion E and the widthwise directional marginal portions W1 and W2.

According to an embodiment of the present invention, the ratio (D2/D1) of the thickness of the edge portion of the lamination main body to the thickness of the central portion of the lamination main body may be 0.78 to 0.95. The thickness D1 of the central portion of the lamination main body may range from 250 µm to 350 µm, but the present invention is not limited thereto. Alternatively, the thickness D1 of the central portion of the lamination main body may range from 310 µm to 320 µm.

If the ratio of D2 to D1 is less than 0.78, the edges of each of the inner electrodes in the widthwise direction would be overly bent to significantly reduce the interval between the vertically adjacent inner electrodes compared with the central portion. Then, an electric field would be concentrated in the edges of each of the inner electrodes in the widthwise direction to degrade the dielectric breakdown voltage characteristics, degrade the characteristics under a high temperature condition and a moisture resistance condition, and degrade an average life span.

Also, if the ratio of D2 to D1 exceeds 0.95, there would be high possibility of the generation of a delamination or cracks, and the cracks would possibly degrade dielectric breakdown voltage characteristics as well as high temperature and moisture resistance characteristics.

FIG. 5 is an enlarged sectional view of a portion of a section in a widthwise direction of the multilayer ceramic capacitor. FIG. 5 may show a section perpendicular with respect to one face, of the lamination main body, from which the edges of inner electrodes are not exposed. FIG. 5 may be a sectional view taken along a line across the central portion of the lamination main body. The non-exposed edges of the inner electrodes formed in the lamination main body can be understood with reference to FIG. 5.

With reference to FIG. 5, according to an embodiment of the present invention, the distance between vertically adjacent inner electrodes in the central portion of the lamination main body may be greater than the distance between vertically adjacent inner electrodes at the edges of the inner electrodes in the widthwise direction.

The distance between the vertically adjacent inner electrodes 121 and 122 in the central portion of the lamination main body may be defined as T1. The central portion of the lamination main body may refer to an area in which the edges of the inner electrodes in the widthwise direction are not bent.

Also, the distance between the vertically adjacent inner electrodes 121 and 122 at the edges of the inner electrodes in the widthwise direction may be defined as T2. The edges of the inner electrodes in the widthwise direction may include an oxidized area of the inner electrodes.

The ratio (T2/T1) of T2 to T1 may be 0.80 to 0.95. The distance T1 between the vertically adjacent inner electrodes 121 and 122 in the central portion of the lamination main body may be less than 0.66 μm, but the present invention is not limited thereto.

If the ratio (T2/T1) of T2 to T1 is less than 0.80, the widthwise directional marginal portions W1 and W2 would possibly be overly compressed, and the edges of the inner electrodes in the widthwise direction would possibly be overly bent. Then, the distance between the edges of the vertically adjacent inner electrodes in the widthwise direction would be shortened, making the dielectric layer positioned therebetween thinner, to causing an electric field to be concentrated therein. Then, the dielectric breakdown voltage would possibly be lowered and high temperature and moisture resistance characteristics would be degraded.

Also, if the ratio (T2/T1) of T2 to T1 exceeds 0.95, the degree of compression of the widthwise directional marginal portions W1 and W2 is so low as to cause a delamination and cracking, the dielectric breakdown voltage would possibly be lowered due to cracking, and the high temperature and moisture resistance characteristics would be degraded.

Figure 6:
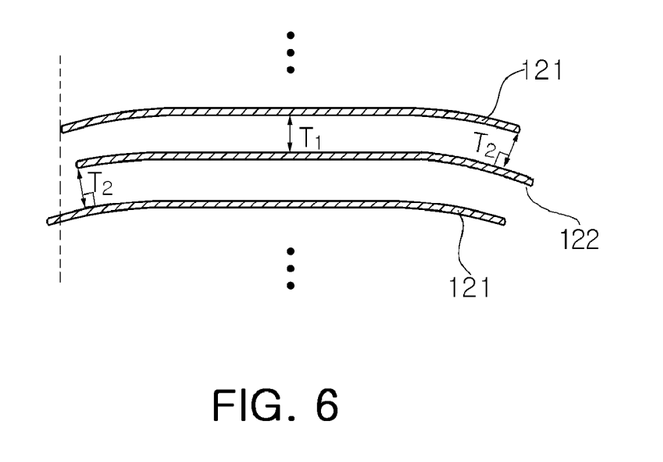
FIG. 6 is an enlarged sectional view of a portion of a section of a multilayer ceramic capacitor according to another embodiment of the present invention.

FIG. 6 is an enlarged sectional view of a portion of a section of a multilayer ceramic capacitor according to another embodiment of the present invention. With reference to FIG. 6, similar to that of FIG. 5, depicted is a section perpendicular to one face from which the edges of the inner electrode of the lamination main body are not exposed. Namely, FIG. 6 illustrates the non-exposed edges of the inner electrodes formed in the lamination main body.

With reference to FIG. 6, according to an embodiment of the present invention, the distance T1 between the central portions of the vertically adjacent inner electrodes 121 and 122 may be longer than the distance T2 between the edges of the vertically adjacent inner electrodes. The central portion of the lamination main body may refer to an area in which the edges of the inner electrodes in the widthwise direction are not bent. The edges of the inner electrodes are portions not exposed from the lamination main body. The edges of the inner electrodes in the widthwise direction may include an oxidized area of the inner electrodes.

According to an embodiment of the present invention, in the sectional view showing the edges of the inner electrodes not exposed from one face of the lamination main body, the end portions of the inner electrodes may not be arranged on a straight line. For example, as shown in FIG. 6, based on a straight line virtually drawn in the lamination direction, the edge of one inner electrode 122 may be shifted to the right, and the edge of one inner electrode may be shifted to the left. Also, in the sectional view, the lengths of the inner electrodes may not be uniform.

According to an embodiment of the present invention, as shown in FIG. 6, the distance T2 between the edges of the vertically adjacent inner electrodes may be defined as the shortest distance from the edge of a non-protruded inner electrode to an adjacent inner electrode, based on a vertical line virtually drawn in the lamination direction from the edge of one inner electrode among vertically adjacent inner electrodes. The virtual vertical line may be drawn from an edge of one of two inner electrodes as a measurement target. The shortest distance may be a length of the vertical line drawn from the edge of the non-protruded inner electrode to its adjacent inner electrode.

The ratio (T2/T1) of T2 to T1 may be 0.80 to 0.95. The distance T1 between the vertically adjacent inner electrodes 121 and 122 in the central portion of the lamination main body may be less than 0.66 μm, but the present invention is not limited thereto.

As described above, in order to reduce the size and increase the capacity of the multilayer ceramic capacitor, the thicknesses of the dielectric layers and the inner electrode layers are required to be reduced and the number of laminated layers thereof is required to be increased. However, if the dielectric layers and the inner electrode layers are thinned and the number of laminated layers is increased, the difference in density between the capacity formation portion in which the inner electrodes overlap each other and the marginal portions in which the inner electrodes are not formed would be increased. Then, the electrode draw-out portion might be delaminated or cracked.

Also, if the marginal portions are overly compressed to increase the density of the marginal portions, the edges of the inner electrodes would be overly bent to shorten the distance between the adjacent inner electrodes. When the dielectric layers have a predetermined thickness, even in the case that the distance between the inner electrodes is shortened, the possibility of dielectric breakdown is low, but as the dielectric layers are thinned, the possibility of dielectric breakdown may be increased. Namely, as the dielectric layers are thinned, the interval between the inner electrodes becomes too narrow, increasing the possibility of dielectric breakdown even at a low voltage.

However, according to the embodiment of the present invention, the thickness of one dielectric layer may be less than 0.66 μm and the thickness of one inner electrode layer may be 0.7 μm or less. Also, two hundred or more of the dielectric layers, on which the inner electrode layers are formed, may be laminated.

As described above, according to the embodiment of the present invention, although the dielectric layers and the inner electrode layers are thinned, the concentration of an electric field in a particular area can be prevented by adjusting the compression ratio between the capacity formation portion and the marginal portions, and the possibility of delamination and crack generation can be reduced.

According to the embodiment of the present invention, the thickness of the central portion of the lamination main body may be greater than the thickness of one face of the lamination main body to which the end of the inner electrode is drawn out.

As shown in FIG. 4, according to the embodiment of the present invention, the thickness D1 of the central portion of the lamination main body may be greater than the thickness D3 of the end face of the lamination main body. The thickness D1 of the central portion of the lamination main body may be measured at the capacity formation portion E. Also, the end face of the lamination main body may refer to a face from which the end of the first inner electrode 121 or the second inner electrode 122 is exposed in the lengthwise direction, which may be an end face formed in the lengthwise direction of the lamination main body. The thickness D3 of the end face of the lamination main body may be measured at the area in which the first inner electrodes 121 or the second inner electrodes 122 are present.

As shown in FIG. 3, the widthwise directional marginal portions W1 and W2 in which the first inner electrodes 121 and the second inner electrodes 122 are not formed are disposed in the widthwise direction of the lamination main body, and the thickness D3 of the end face of the lamination main body may be the thickness of the area in which the first inner electrodes 121 or the second inner electrodes 122 are present, rather than the widthwise directional marginal portions W1 and W2.

As described above, there may be a difference in density between the capacity formation portion and the marginal portion, and in this case, the difference in density may be adjusted by differentially compressing the capacity formation portion and the lengthwise directional marginal portion. The incidence of delamination or cracks in the multilayer ceramic capacitor can be lowered and dielectric breakdown voltage characteristics can be improved by adjusting the ratio of the thickness between the capacity formation portion and the marginal portion.

The ratio (D3/D1) of the thickness of the end face of the lamination main body to that of the central portion of the lamination main body may be 0.75 to 0.97.

If the ratio (D3/D1) of the thickness of the end face of the lamination main body to that of the central portion of the lamination main body is less than 0.75, an electric field would possibly be concentrated in the ends of the inner electrodes in the lengthwise direction to degrade the dielectric breakdown voltage characteristics as well as high temperature and moisture resistance characteristics, although the possibility of the generation of delamination and cracking in the marginal portion is low.

Also, if the ratio (D3/D1) of the thickness of the end face of the lamination main body to that of the central portion of the lamination main body exceeds 0.97, there would be high possibility that the marginal portion would be delaminated or cracked and hightemperature and moisture resistance characteristics would possibly be degraded.

A method of manufacturing a multilayer ceramic capacitor (MLCC) according to an embodiment of the present invention will now be described.

First, inner electrode patterns may be formed on a plurality of ceramic green sheets. The ceramic green sheets may be formed of ceramic paste including ceramic powder, an organic solvent, and an organic binder.

The ceramic power having a high permeability, may include a barium titanate ($BaTiO_3$)-based material, strontium titanate ($SrTiO_3$)-based material, or the like, but the present invention is not limited thereto. When the ceramic green sheets are fired, dielectric layers constituting the lamination main body can be obtained.

The inner electrode patterns may be formed of an inner electrode paste including conductive metal. The conductive metal may be nickel (Ni), copper (Cu), palladium (Pd), or an alloy thereof, but the present invention is not limited thereto.

A method of forming the inner electrode patterns on the ceramic green sheets is not particularly limited. For example, the inner electrode patterns may be formed by a printing method such as a screen printing method, a gravure printing method, or the like.

A ceramic green sheet lamination may be formed by laminating the ceramic green sheets such that the inner electrode patterns formed on the individual ceramic green sheets are exposed from different end faces by a follow-up cutting process. A thickness ratio of the lamination main body can be adjusted by compressing the ceramic green sheet lamination. As described above, according to an embodiment of the present invention, the marginal portion may be intensively compressed as compared with the capacity formation portion. Also, the end faces and edge portions of the lamination main body may be intensively compressed as compared with the central portion of the lamination main body.

The compression may be performed with a certain pressure. The compression may be performed by isostatic pressing, but the present invention is not limited thereto. The compression may be performed under pressure conditions of 500 $kgf/cm^2$ to 1,500 $kgf/cm^2$, but the present invention is not limited thereto. In order to differentially compress the capacity formation portion and the electrode draw-out portion of the lamination main body during the isostatic pressing, a subsidiary material may be applied to upper and lower surfaces of the ceramic green sheet lamination. A polyethyleneterephtalate (PET) film, a vinyl film, rubber, or the like, may be used as the subsidiary material, but the present invention is not limited thereto.

Also, the compression may be performed at a certain temperature. The compression may be performed at 50□ to 100□, but the present invention is not limited thereto.

The ceramic green sheet lamination may be cut to expose the ends of the inner electrodes in the lengthwise direction from the end faces thereof, thereby forming a ceramic green chip. The ceramic green chip may be plasticized and fired to form a lamination main body.

The plasticization process may be performed for de-binderizing, and it may be performed under an air atmosphere, but the present invention is not limited thereto.

The firing process may be performed under a reduction atmosphere such that the inner electrodes may not be oxidized. The firing process may be performed at a temperature ranging from 900° C. to 1,300° C.

Then, outer electrodes may be formed to be electrically connected with the ends of the inner electrodes exposed from the end faces of the lamination main body. Thereafter, the surface of the external electrodes may be plated with nickel, tin, or the like.

The present invention will be described in more detail with reference to examples and comparative examples, but this is to help understand the present invention properly and the scope of the invention is not limited by these examples.

Example

Ceramic green sheets, having a thickness of 0.90 µm, 1.00 µm, and 1.25 µm, respectively, were prepared. Inner electrode paste was printed on each of the ceramic green sheets, and two hundred ceramic green sheets were laminated to manufacture a ceramic lamination. The ceramic lamination was subjected to isostatic pressing under pressure conditions of 500 kgf/ cm², 800 kgf/cm² and 1000 kgf/cm², at 85° C., respectively. In this case, the ceramic lamination was compressed such that the central portion of the lamination main body was larger than edge portions of the lamination main body in the widthwise direction.

The compression-completed ceramic lamination was cut in the form of individual chips. The separated individual chips were maintained under an air atmosphere at 230☐ for 60 hours to perform de-binderizing. Thereafter, the individual chips were fired at 1,200☐ under an oxygen partial pressure of $10^{-11}$ atm~$10^{-10}$ atm, lower than a Ni/NiO equilibrium oxygen partial pressure, in a reduction atmosphere such that the inner electrodes were not oxidized. After the firing operation, an average thickness of the inner electrode layers was 0.65 μm. The size of the fired chips satisfied 0.6±0.09 mm×0.3±0.09 mm×0.3±0.09 mm (L×W×T). Here, T is the thickness of the central portion of the lamination main body.

The characteristics of the fired chips were evaluated and Table 1 below shows the corresponding results.

Sections of hundreds of fired chips were inspected, and the incidence of delamination and cracking of the fired chips was expressed by percentage.

Dielectric breakdown voltage (BDV) characteristics were evaluated by applying a DC voltage at a rate of 10 V/sec, and an average life span of the fired chips was determined as a duration of time until insulation resistance was dropped to below $10^4 \Omega$.

in the widthwise direction were measured, and average measurement values are shown in Table 1.

With reference to Table 1, in comparative examples 1 through 4 in which the thickness of the dielectric layers after firing was 0.60 μm or greater, no delamination or cracking was generated, irrespective of the ratio of T1 and T2 and a high DVB and an excellent accelerated life span were achieved.

However, in comparative examples 5 and 7, the compression rate of the marginal portion was low, and the ratio of T2 to T1 was high. Thus, a delamination/cracking incidence was high and an average life span was degraded. Also, in comparative examples 6 and 8, the comparison ratio of the marginal portion was high, and delamination/cracking was not generated because the ratio of T2 to T1 was low, but the BDV characteristics were degraded due to excessive compression, and an average life span was degraded.

This is because the edges of the inner electrodes in the widthwise direction were overly bent, shortening the distance between the edges of the inner electrodes in the widthwise direction, so an electric field was concentrated therein.

In examples 1 through 4, no delamination/cracking was generated and the BDV characteristics and an average life span were excellent.

As set forth above, according to the embodiments of the present invention, the capacity formation portion and the widthwise directional marginal portion are differentially

TABLE 1

| | Thickness of ceramic green sheet | Lamination Pressure (kgf/cm²) | T1 (μm) | T2 (μm) | T2/T1 | Delamination/ crack incidence (%) | BDV (V) | Average life Span (hr) |
|---|---|---|---|---|---|---|---|---|
| Comparative example 1 | 1.25 | 500 | 0.69 | 0.65 | 0.94 | 0 | 83 | 115 |
| Comparative example 2 | 1.25 | 800 | 0.69 | 0.60 | 0.87 | 0 | 80 | 108 |
| Comparative example 3 | 1.25 | 1000 | 0.67 | 0.55 | 0.82 | 0 | 81 | 109 |
| Comparative example 4 | 1.25 | 1200 | 0.66 | 0.51 | 0.77 | 0 | 78 | 110 |
| Comparative example 5 | 1.00 | 500 | 0.55 | 0.53 | 0.96 | 17 | 73 | 35 |
| Example 1 | 1.00 | 800 | 0.53 | 0.48 | 0.91 | 0 | 71 | 95 |
| Example 2 | 1.00 | 1000 | 0.51 | 0.42 | 0.82 | 0 | 69 | 93 |
| Comparative example 6 | 1.00 | 1200 | 0.49 | 0.36 | 0.73 | 0 | 30 | 28 |
| Comparative example 7 | 0.90 | 500 | 0.50 | 0.49 | 0.98 | 22 | 68 | 27 |
| Example 3 | 0.90 | 800 | 0.49 | 0.46 | 0.94 | 0 | 65 | 90 |
| Example 4 | 0.90 | 1000 | 0.47 | 0.40 | 0.85 | 0 | 63 | 91 |
| Comparative example 8 | 0.90 | 1200 | 0.45 | 0.34 | 0.76 | 0 | 28 | 19 |

Here, T1 is the distance between the central portions of vertically adjacent inner electrodes, and T2 is the distance between the non-exposed edges of the vertically adjacent inner electrodes. In this embodiment, a measurement was made in the widthwise directional section obtained by cutting the central portion of the lamination main body, as shown in FIG. 3.

In detail, an image of the widthwise directional section obtained by cutting the central portion of the lamination main body of each sample was scanned by a scanning electron microscope (SEM) of 10,000 magnifications. Ten pairs of adjacent inner electrodes were randomly extracted from the scanned images, the distance T1 between the central portions of the vertically adjacent inner electrodes and the distance T2 between the edges of the vertically adjacent inner electrodes compressed to reduce a difference in density. The incidence of delamination or cracking in the multilayer ceramic capacitor is lowered by adjusting the thickness ratio between the capacity formation portion and the marginal portion, and the dielectric breakdown voltage characteristics can be improved.

According to the embodiments of the present invention, the distance between vertically adjacent inner electrodes at the central portion of the lamination main body is longer than the distance between vertically adjacent inner electrodes at the edges of the inner electrodes in the widthwise direction. The distance between the vertically adjacent inner electrodes at the edges of the inner electrodes in the widthwise direction can be adjusted to prevent an electric field from being concentrated in the edges of the inner electrodes. Accordingly, the possibility of the generation of delamination or cracking in the marginal portion can be reduced, and high temperature and moisture resistance characteristics and an average life span can be improved.

According to the embodiments of the present invention, the ratio between the thickness of the central portion of the lamination main body and that of the end face of the lamination main body can be adjusted to prevent an electric field from being concentrated in the ends of the inner electrodes in the lengthwise direction, whereby the possibility of the generation of delamination or cracking can be lowered, and the dielectric breakdown voltage characteristics can be enhanced.

According to the embodiments of the present invention, although the dielectric layers and the inner electrode layers are thinned, the concentration of an electric field in a particular area can be prevented by adjusting the compression ratio between the capacity formation portion and the marginal portion. Thus, the possibility of the generation of delamination or cracking can be lowered, and the dielectric breakdown voltage characteristics and high temperature and moisture resistance characteristics can be improved.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
    a lamination main body including a plurality of inner electrodes,
    when T1 represents a distance between vertically adjacent inner electrodes in a central portion of the lamination main body, and T2 represents a shortest distance from an edge of a first one among the plurality of inner electrodes to a second one among the plurality of inner electrodes, adjacent to the first inner electrode,
    wherein the distance T1 is less than 0.66 μm, and a ratio (T2/T1) of T2 to T1 is 0.80 to 0.95.

2. The multilayer ceramic electronic component of claim 1, wherein the distances T1 and T2 are measured in a section perpendicular to a first face of the lamination main body, the edges of the inner electrodes being not exposed from the first face of the lamination main body.

3. The multilayer ceramic electronic component of claim 1, wherein a thickness D1 of the central portion of the lamination main body is greater than a thickness D2 of a first face of the lamination main body, the edges of the inner electrodes being not exposed from the first face of the lamination main body.

4. The multilayer ceramic electronic component of claim 3, wherein a ratio of the thickness D2 of the first face of the lamination main body to the thickness D1 of the central portion of the lamination main body is 0.78 to 0.95.

5. The multilayer ceramic electronic component of claim 3, wherein the thickness D1 of the central portion of the lamination main body is measured at a capacity formation portion in which the plurality of inner electrodes overlap each other.

6. The multilayer ceramic electronic component of claim 3, wherein the thickness D1 of the central portion of the lamination main body ranges from 200 μm to 300 μm.

7. The multilayer ceramic electronic component of claim 1, wherein a thickness D1 of the central portion of the lamination main body is greater than a thickness D3 of a second face of the lamination main body, the ends of the inner electrodes being exposed from the second face of the lamination main body.

8. The multilayer ceramic electronic component of claim 7, wherein a ratio of the thickness D3 of the second face of the lamination main body to the thickness D1 of the central portion of the lamination main body is 0.75 to 0.97.

9. The multilayer ceramic electronic component of claim 8, wherein the thickness D3 of the second face of the lamination main body is measured at an area of the lamination main body in which the inner electrodes are present.

10. The multilayer ceramic electronic component of claim 1, wherein a thickness of one of the inner electrode layers is 0.7 μm or less.

11. A multilayer ceramic electronic component, comprising:
    a lamination main body including a plurality of inner electrodes,
    when T1 represents a distance between vertically adjacent inner electrodes in a central portion of the lamination main body, and T2 represents a shortest distance from an edge of a first one among the plurality of inner electrodes to a second one among the plurality of inner electrodes, adjacent to the first inner electrode,
    wherein a ratio (T2/T1) of T2 to T1 is 0.80 to 0.95.

12. The multilayer ceramic electronic component of claim 11, wherein the distances T1 and T2 are measured in a section perpendicular to a first face of the lamination main body, the edges of the inner electrodes being not exposed from the first face of the lamination main body.

13. The multilayer ceramic electronic component of claim 11, wherein a thickness D1 of the central portion of the lamination main body is greater than a thickness D2 of a first face of the lamination main body, the edges of the inner electrodes being not exposed from the first face of the lamination main body.

14. The multilayer ceramic electronic component of claim 13, wherein a ratio of the thickness D2 of the first face of the lamination main body to the thickness D1 of the central portion of the lamination main body is 0.78 to 0.95.

15. The multilayer ceramic electronic component of claim 13, wherein the thickness D1 of the central portion of the lamination main body is measured at a capacity formation portion in which the plurality of inner electrodes overlap each other.

16. The multilayer ceramic electronic component of claim 13, wherein the thickness D1 of the central portion of the lamination main body ranges from 200 μm to 300 μm.

17. The multilayer ceramic electronic component of claim 11, wherein a thickness D1 of the central portion of the lamination main body is greater than a thickness D3 of a second face of the lamination main body, the ends of the inner electrodes being exposed from the second face of the lamination main body.

18. The multilayer ceramic electronic component of claim 17, wherein a ratio of the thickness D3 of the second face of the lamination main body to the thickness D1 of the central portion of the lamination main body is 0.75 to 0.97.

19. The multilayer ceramic electronic component of claim 18, wherein the thickness D3 of the second face of the lamination main body is measured at an area of the lamination main body in which the inner electrodes are present.

20. The multilayer ceramic electronic component of claim 11, wherein a thickness of one of the inner electrode layers is 0.7 μm or less.

* * * * *